US005577436A

United States Patent [19]

Kimbara

[11] Patent Number: 5,577,436
[45] Date of Patent: Nov. 26, 1996

[54] STEPPING ACTUATORS

[75] Inventor: Masahiko Kimbara, Kamakura, Japan

[73] Assignee: Three-D Composites Research Corporation, Kamakura, Japan

[21] Appl. No.: 365,843

[22] Filed: Dec. 29, 1994

[30] Foreign Application Priority Data

Dec. 29, 1993 [JP] Japan .................. 5-350114

[51] Int. Cl.⁶ .................. F16J 1/10; F01B 9/00
[52] U.S. Cl. .................. 92/116; 92/136; 91/170 R
[58] Field of Search .................. 91/170 R, 181,
91/184, 154; 92/68, 69 R, 70, 31, 32, 33,
129, 116, 136

[56] References Cited

U.S. PATENT DOCUMENTS

| | | | |
|---|---|---|---|
| 2,806,450 | 9/1957 | Geyer | 92/116 X |
| 3,771,918 | 11/1973 | Winter | 92/136 X |
| 3,824,905 | 7/1974 | Jablonsky | 92/136 |
| 4,375,304 | 3/1983 | Schopper et al. | 92/68 X |
| 4,508,016 | 4/1985 | Weyer | 92/136 X |
| 4,796,514 | 1/1989 | Richter | 92/70 X |
| 5,447,095 | 9/1995 | Weyer | 92/116 X |

FOREIGN PATENT DOCUMENTS 263329  12/1988  Germany .................. 92/116

*Primary Examiner*—Hoang Nguyen
*Attorney, Agent, or Firm*—Oblon, Spivak, McClelland, Maier & Neustadt, P.C.

[57] ABSTRACT

A stepping actuator having a housing containing two linearly reciprocating members independently and axially slidable, and a common rotating member passed through them. One of the housing and linearly reciprocating members has endless circulating grooves formed by tilted grooves interconnected by circumferentially extending grooves while another one of them holds projections adapted to fit in the circulating grooves. The circumferentially extending grooves have a circumferential length equal to a circumferential length of an opposite tilted groove corresponding to another of said slidable reciprocating members. The linearly reciprocating members and rotating member are linked together by a coupling that transmits the rotary motion while allowing free axial motion.

12 Claims, 13 Drawing Sheets

FIG. 9
← ADVANCE OF FORWARD ROTATION PROGRAM
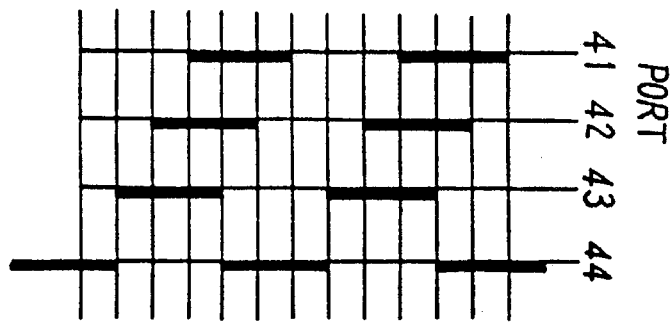
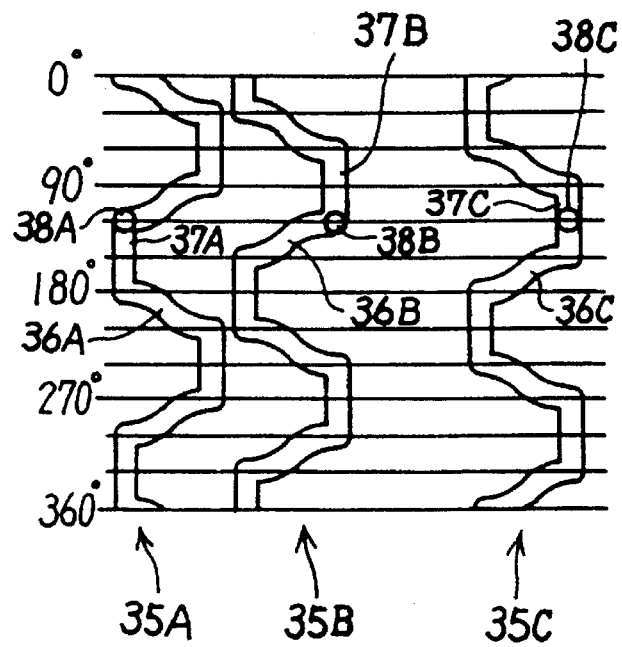
REVERSE ROTATION ←→ FORWARD ROTATION
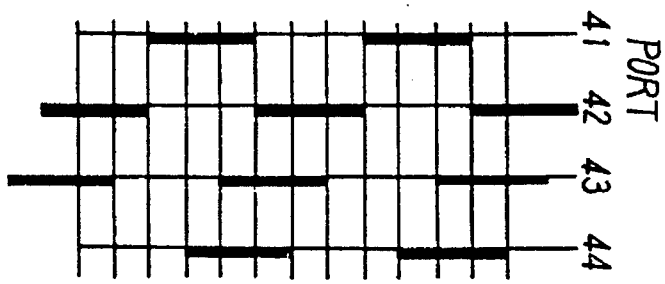
ADVANCE OF REVERSE ROTATION PROGRAM →

STEPPING ACTUATORS

BACKGROUND OF THE INVENTION

1. Field of the Invention

This invention relates to rotary stepping actuators that convert linear reciprocating motion to stepwise rotary motion, clockwise and backward, through a predetermined angle.

2. Discussion of the Background

Many industrial machines are required to produce stepwise rotary motion, forward and backward, through a given angle. To fulfill this requirement, the inventor proposed a stepping actuator that converts the reciprocating motion of each of a pair of pistons to stepwise forward or backward rotary motion through a given angle in Japanese Patent Application No. 354183 of 1992.

This stepping actuator comprises an outer frame that constitutes a hydraulic cylinder containing a pair of axially moving members serving as pistons. Through the axially moving members are passed a common rotating power output member. Either one of the outer frame and axially moving members has peripheral grooves that are alternately tilted in opposite directions with respect to the generator and connected to each other at both ends thereof to make up an endless circulating chain of grooves, while the other has projections to fit in the grooves described above.

A mechanism is provided for each circulating chain of grooves to allow the projections to select one adjoining groove after another when the axially moving member changes the direction of motion at each end thereof. The groove selection mechanism are designed to cause the projections to select the adjoining grooves tilted in opposite directions, thereby causing one of the axially moving members to rotate forward and the other backward. The ends of both circulating grooves are connected by circumferentially extending grooves. An example of the groove selection mechanism comprises a "go" groove along which the projector moves toward one end thereof when the axially moving member makes a reciprocating motion and a "return" groove connected thereto, with a step provided between the two grooves that makes the "return" groove deeper than the "go" groove.

Though simple in construction and capable of making a desired stepped rotation, forward or backward, this mechanism does not have adequate torque to hold the output shaft in position after it has been rotated stepwise by the motion of the axially moving member. Therefore, the output shaft continues to rotate when an overload is applied thereon. When some excessive load or disturbance acts during the motion of the axially moving member, in addition, each projection of the groove selection mechanism reciprocates in the same groove instead of moving to the desired adjoining groove. Then, the output shaft moves back and forth within a limited angular path without making a unidirectional rotation. It has therefore been desired to realize a mechanism to ensure that the output shaft makes a stable unidirectional rotation.

SUMMARY OF THE INVENTION

The technical object of this invention is to provide a rotary stepping actuator for converting linear reciprocating motion into stepped rotary motion, forward or backward, through a given angle that allows the output shaft to make a stable and smooth stepped rotation in the desired direction by ensuring that the projections move into the desired adjoining groove.

In order to achieve the above object, a stepping actuator according to this invention comprises a cylindrical housing containing multiple linearly reciprocating members that are coaxially disposed so that each of them can independently make axial movement, with a common rotating member having an output shaft protruding from the housing passed through the multiple reciprocating members. There is provided in the circumferential surface of one of the housing and linearly reciprocating members or the linearly reciprocating members and rotating member an endless zigzag circulating groove made up of a number of grooves alternately tilted in opposite directions with respect to the generator and connected to each other at both ends thereof by circumferentially extending grooves. The other holds projections adapted to fit in the circulating groove. The circumferential length of each of the circumferentially extending grooves corresponds to the sum of the angles of rotation imparted by the tilted grooves between the housing and linearly reciprocating members or between the linearly reciprocating members and rotating member when the other linearly reciprocating member moves axially. The linearly reciprocating members, rotating member and housing having neither the circulating groove nor the projections are connected by couplings that allow the axial motion of the connected members while restricting the rotation thereof.

In the stepping actuator of this invention described above, the angle of rotation imparted by the tilted grooves of the circulating groove when the linearly reciprocating members move axially can be varied. Or otherwise, the circumferential length of the circumferentially extending grooves in the circulating groove cut on each of the linearly reciprocating members may be adjusted to correspond to the angle of rotation imparted by the tilted grooves between the linearly reciprocating and rotating members when the other linearly reciprocating member moves axially.

If a groove similar to the circulating groove is cut on the member coupled with the linearly reciprocating members, balls may fitted in the facing grooves to perform the same function as the projections described before. The balls are then held between the facing grooves by means of retainers.

Another stepping actuator according to this invention has a motion converting unit comprising a cylindrical housing containing an axially movable linearly reciprocating member through which a rotating member is passed, with an output shaft extending therefrom protruding from the housing. Multiple motion converting units are disposed one after another, with the output shafts thereof rotatably connected together by rotation transmitting mechanisms.

Either one the housing and linearly reciprocating members or of the linearly reciprocating members and rotating member of each motion converting units has an endless zigzag circulating groove made up of a number of grooves alternately tilted in opposite directions with respect to the generator and connected to each other at both ends thereof by circumferentially extending grooves. The other hold projections adapted to fit in the circulating groove. The circumferential length of each of the circumferentially extending grooves on each motion converting unit corresponds to the sum of the angles of rotation imparted by the tilted grooves when the other linearly reciprocating member moves axially.

The linearly reciprocating members, rotating member and housing having neither the circulating groove nor projections are connected by couplings that allow the axial motion of the connected members while restricting the rotation thereof.

The rotation transmitting mechanisms connecting together the output shafts of the motion converting units may be designed to provide a given angular velocity ratio between the output shafts connected thereby.

A multiplex stepping actuator can be obtained by providing a second stepping actuator outside a first stepping actuator having multiple coaxially disposed linearly reciprocating members described before. The second stepping actuator comprises multiple linearly reciprocating members disposed around the housing of the first stepping actuator that serves as a rotating member. The selective motion of the linearly reciprocating members realizes a stepped forward or backward rotary motion.

A hydraulic cylinder to axially drive the linearly reciprocating members may be used as the housing of the stepping actuators of this invention. Then, each of the linearly reciprocating members functions as a piston moving under fluid pressure acting on the end surface thereof.

A stepping actuator according to this invention consists essentially of a housing and multiple linearly reciprocating members that can be independently moved axially. Either of the housing and linearly reciprocating members or of the linearly reciprocating members and a rotating member passed therethrough has a circulating groove comprising tilted grooves and circumferentially extending grooves cut in the circumferential surface thereof, whereas the other member hold projections adapted to fit in the circulating groove.

When one of the linearly reciprocating members of this stepping actuator is moved axially, the projectors move from one end of the tilted grooves to the other end thereof, whereby the rotating member rotates through an angle imparted by the tilted grooves, with the rotary motion thereof transmitted to the output shaft. Then, the projections moves further from one end of the circumferentially extending grooves to the other end thereof.

When the other linearly reciprocating member is moved, the projections corresponding thereto similarly move along the tilted grooves, whereby the rotating member rotates in the same direction through an angle defined thereby. When the linearly reciprocating member first driven is moved in the opposite direction, the rotation of the output shaft is reversed.

Thus the linear motion of the selectively driven multiple linearly reciprocating members can be converted to stepwise forward or backward rotary motion through a predetermined angle. Moving along one continuous circulating groove, the projections infallibly move from one tilted groove to another, thus assuring the attainment of smooth and stable rotation of the output shaft in the desired direction.

BRIEF DESCRIPTION OF THE DRAWINGS

FIG. 9 is an exploded view showing the pattern of the circulating grooves of the third embodiment, with the accompanying charts illustrating the operation program thereof.

DETAILED DESCRIPTION OF THE PREFERRED EMBODIMENTS

Figure 1:
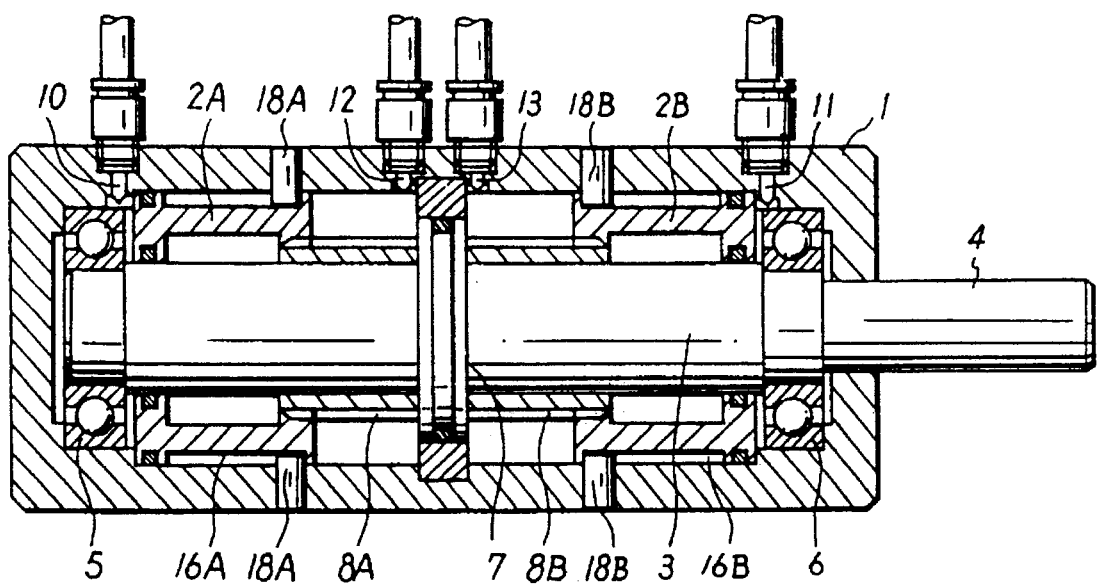
FIG. 1 is a vertical cross-sectional view of a first embodiment of this invention.
Figure 2:
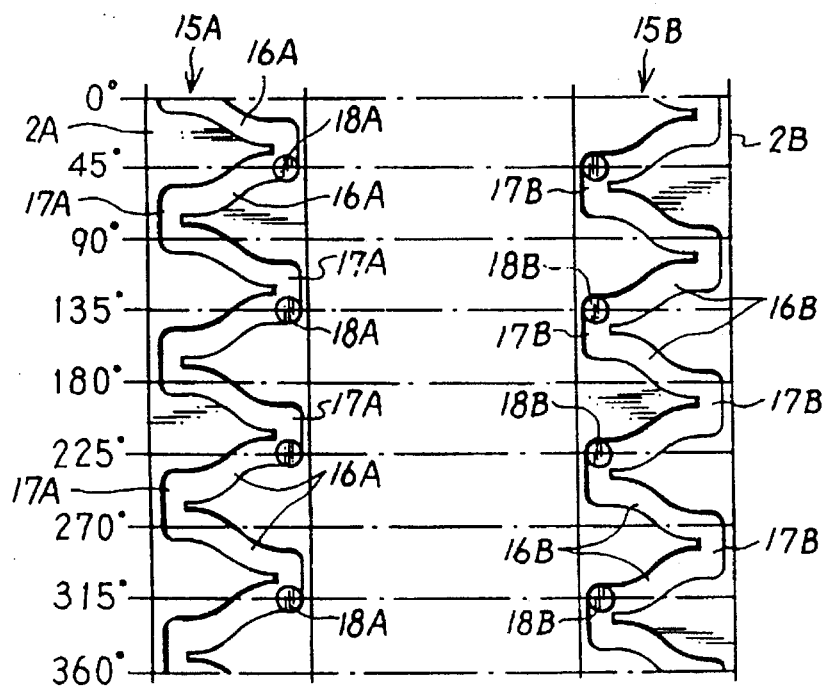
FIG. 2 is an exploded view showing the pattern of the circulating grooves cut in the surface of the linearly reciprocating members of the first embodiment.

FIGS. 1 and 2 show a first preferred embodiment of the stepping actuators according to this invention.

This stepping actuator converts the axial motion of two linearly reciprocating members to rotary motion, outputting a rotational motion through an angle corresponding to the number of strokes of the linearly reciprocating members through an output shaft connected to a rotating member 3 passed therethrough. A cylindrical housing 1 contains two coaxially slidable linearly reciprocating members 2A and 2B that can be independently driven in the direction of the axis thereof. A common rotating member 3 rotatably supported by bearings 5 and 6 is passed through the linearly reciprocating members, with an output shaft 4 connected thereto axially protruding from the housing 1.

The housing 1 whose both ends are hermetically sealed is divided into two independent fluid pressure chambers serving as cylinders by means of a partition plate 7 mounted on the rotating member 3 and kept in airtight contact with the inner wall of the housing 1. The linearly reciprocating members 2A and 2B serve as pistons hermetically sliding along the inner wall of the housing 1 and the circumferential surface of the rotating member 3. The fluid pressure (pneumatic or oil) supplied through ports 10 and 11 at both ends of the housing 1 acts on the outer end surface of each piston to cause it to move inward, while the fluid pressure supplied through ports 12 and 13 in the middle of the housing 1 acts on the inner end surface of each piston to cause it to move outward.

A solenoid or other mechanical driving means may also be connected to the linearly reciprocating members 2A and 2B in place of the hydraulic drive cylinder just described. The same is true for all other embodiments employing hydraulic drive cylinders that will be described later.

The linearly reciprocating members 2A and 2B and the rotating member 3 are connected together by coupling means that transmits the rotary motion of the individual members to each other while allowing the free axial motion thereof. An example of this coupling means comprises a number of axially extending projected ridges 8A and 8B raised on the circumferential surface of the rotating member 3 and a corresponding number of grooves cut in the surface of the linearly reciprocating members 2A and 2B to accommodate the ridges therein. The ridges and grooves are slidably splined together. This coupling means is not limited to the spline. It may consist of an axial groove cut in either of the linearly reciprocating members 2A and 2B or the rotating member 3 and a projection raised on the other to fit in the axial groove. Otherwise, coupling may also be achieved by inserting a sliding key inserted between the deformed sliding surfaces of the linearly reciprocating members 2A and 2B and the rotating member 3.

Endless zigzag circulating grooves 15A and 15B are provided in the surface of the linearly reciprocating members 2A and 2B contained in the housing 1. As shown in FIG. 2, the circulating grooves 15A and 15B consist of a number of grooves 16A and 16B that are alternately tilted in opposite directions with respect to the generator and circularly extending grooves 17A and 17B that connect the adjoining tilted grooves at both ends thereof.

On the inner wall of the housing 1 are raised projections 18A and 18B that are adapted to fit in the circulating grooves 15A and 15B cut in the facing surface of the linearly reciprocating members 2A and 2B.

The projections 18A and 18B illustrated are inwardly protruding pins that are planted in the housing 1. Cam followers or balls held in the holes provided in the housing 1 may also be used in place of the pins. The same is true for all other embodiments of similar construction that will be described later.

The embodiment being described has the circulating grooves 15A and 15B cut in the surface of the linearly reciprocating members 2A and 2B and the projections 18A and 18B to fit therein held by the housing 1. Instead, the circulating grooves 15A and 15B may be cut in the inner wall of the housing 1 and the projections 18A and 18B held by the linearly reciprocating members 2A and 2B.

The circumferential length of the circumferentially extending grooves 17A and 17B of the circulating grooves 15A and 15B on the linearly reciprocating grooves 2A and 2B corresponds to the angle of rotation imparted to the linearly reciprocating members 2B and 2A by the tilted grooves 16B and 16A when the linearly reciprocating members 2B and 2A move axially. When the linearly reciprocating member 2A moves axially, for example, the angle of rotation the tilted grooves 16A impart thereto becomes equal to the angle of rotation imparted by the circumferential length of the circumferentially extending groove 17B in the corresponding position of the linearly reciprocating member 2B.

Therefore, the tilted and circumferentially extending grooves 16A and 17B as well as 16B and 17A of the circulating grooves 15A and 15B on the linearly reciprocating members 2A and 2B are provided in the corresponding position within the same angular range around the periphery of the linearly reciprocating members 2A and 2B.

When pressurized fluid supplied from the port 10 of the stepping actuator just described moves the linearly reciprocating member 2A rightward from the left end in FIG. 1, the projections 18A shift their position from the right end of the tilted grooves 16A to the left end thereof in FIG. 2 (as a result of the motion of the tilted grooves 16A). Then, the linearly reciprocating member 2A rotates through an angle (22.5 degrees) imparted by the tilted grooves 16A, while the projections 18B moves from one end of the circumferentially extending grooves 17B of the circulating groove 15B on the linearly reciprocating member 2B to the other end thereof. Of course, the rotation of the linearly reciprocating member 2A is transmitted to the rotating member 3.

Figures 3A, 3B:
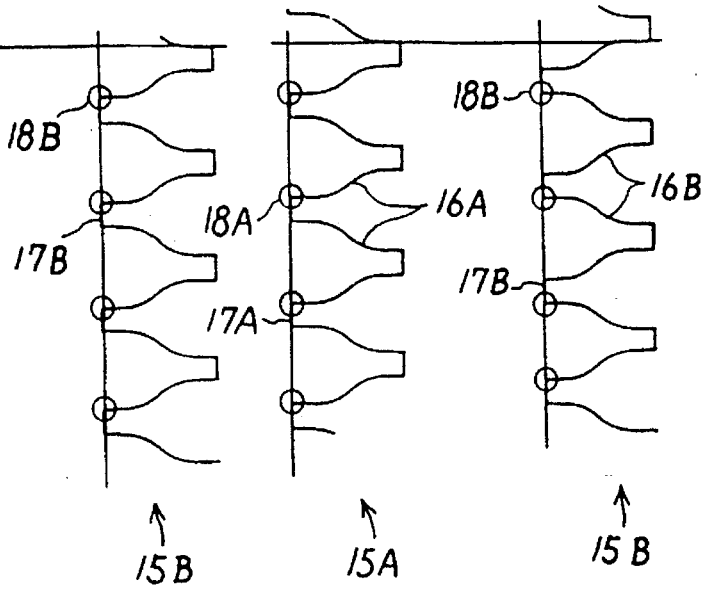
FIGS. 3A to 3D illustrate the operation of the first embodiment.

FIG. 3A and 3B show the state of the linearly reciprocating member 2A before and after moving. For simplicity, the circulating grooves in FIG. 3 are indicated by only the center line thereof, and the same is true for other similar drawings that will be referred to later.

When pressurized fluid supplied from the port 11 moves the linearly reciprocating member 2B leftward from the position shown in FIG. 1, a state shown in FIG. 3 results. The projections 18B move along the tilted grooves 16B to cause the linearly reciprocating member 2B to rotate in the same direction as mentioned before through an angle (22.5 degrees) imparted by the contour of the grooves. Then, the rotation is transmitted to the rotating member 3 and output through the output shaft 4. In the meantime, the projections 18A move from one end of the circumferentially extending grooves 17A of the circulating groove 15A on the linearly reciprocating member 2A to the other end thereof.

Figures 3C, 3D:
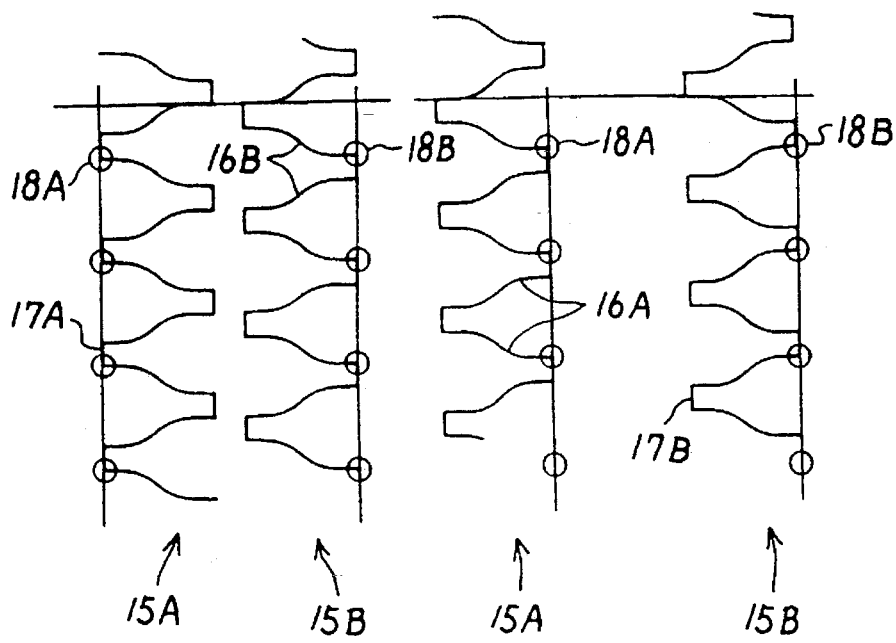

After discharging the pressurized fluid supplied before from the port 10, pressurized fluid is supplied from the port 12 to move the linearly reciprocating member 2A to the left end in FIG. 1, thus changing the state of FIG. 3C to one shown in FIG. 3D. The projections 18A move along the tilted grooves 16A to cause the linearly reciprocating member 2A to rotate in the same direction through an angle (22.5 degrees) imparted by the contour of the grooves. Then, the rotation is transmitted to the rotating member 3 and output through the output shaft 4. In the meantime, the projections 18B move from one end of the circumferentially extending grooves 17B of the circulating groove 15B on the linearly reciprocating member 2B to the other end thereof. After discharging the pressurized fluid supplied before from the port 11, pressurized fluid is supplied from the port 13 to cause the linearly reciprocating member 2B to move to the right end in FIG. 1, whereupon the projections 18B move along the tilted grooves 16B, thus changing the state of FIG. 3D to one similar to that shown in FIG. 3D except that the linearly reciprocating member 2B has rotated forward through an angle of 90 degrees. In the meantime, the projections 18A of course move from one end of the circumferentially extending grooves 17A on the linearly reciprocating member 2A to the other end thereof.

Thus, the axial motion of either the linearly reciprocating member 2A or 2B selected is converted into the rotary motion of the rotating member 3 that is then surely rotated through a desired angle, forward or backward. The two linearly reciprocating members 2A and 2B take four different sets of position shown in FIGS. 3A to 3D. In any of these states, the linearly reciprocating members 2A and 2B can be moved in either direction. The motion of either the linearly reciprocating member 2A or 2B causes the output shaft 4 to rotate forward or backward.

If the linearly reciprocating members 2A and 2B are moved in the order reversed from the one shown in FIG. 3, for example, the output shaft 4 is rotated through a desired angle in the opposite direction. Furthermore, rotation can be reversed by reversing the direction of the motion of the linearly reciprocating member at any desired midway point.

The precise motion of the projections 18A and 18B in the circulating grooves 15A and 15B of the stepping actuator always allows the output shaft 4 to rotate stepwise stably and smoothly in the desired direction.

When the linearly reciprocating members 2A and 2B are moved stepwise and the projections 18A and 18B reach the points where the tilted grooves 16A and 16B intersect the circumferentially extending grooves 17A and 17B, the projections 18A and 18B positioned at one end of the circumferentially extending grooves 17A and 17B restrict the rotation of the linearly reciprocating members 2A and 2B in either direction, as is obvious from FIG. 2. This keeps the output shaft 4 from rotating even under overload, thus imparting a great holding torque thereto.

The position of the linearly reciprocating members 2A and 2B of the stepping actuator described above can be detected by any of the conventionally used methods, such by means of a magnetic sensor disposed outside the housing 1 that detects a magnet attached to the linearly reciprocating members 2A and 2B. A rotary encoder attached to the output shaft 4 determines the angle of rotation thereof. These means tell the completion of motion and other operating conditions with ease.

The stepping actuator just described always rotates the output shaft 4 through a given angle (22.5 degrees), either forward or backward, by moving the linearly reciprocating members 2A and 2B. However, the angle of rotation of the linearly reciprocating members 2A and 2B in each step can be varied as desired to meet the actual service requirements by adjusting the angle of the tilted grooves 16A and 16B of the circulating grooves 15A and 15B.

Figure 4:
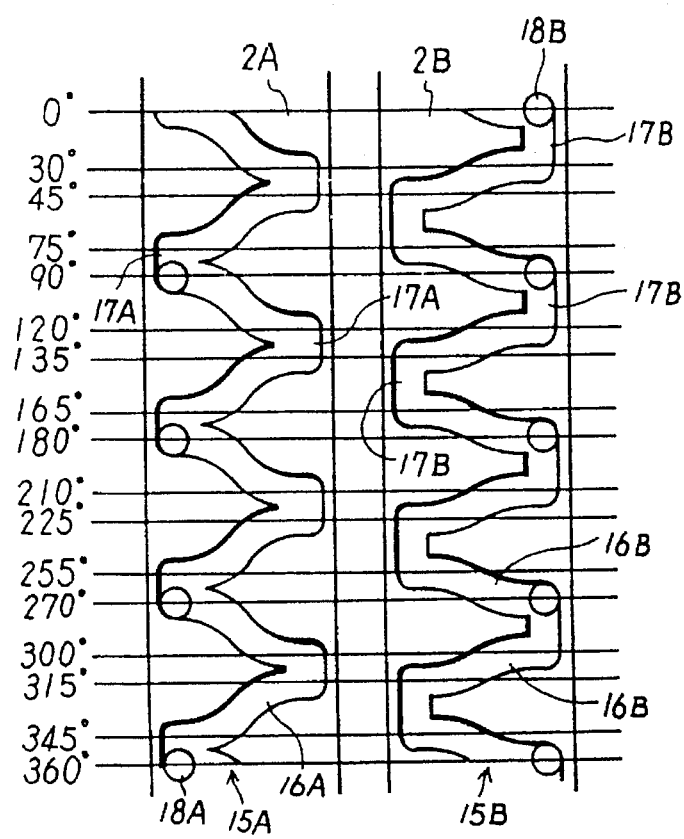
FIG. 4 is an exploded view showing a modification of the circulating groove in the surface of the linearly reciprocating members of the first embodiment.

FIG. 4 shows an example that provides two angles of rotation; the motion of the linearly reciprocating members 2A and 2B respectively provide an angle of rotation of 30 and 15 degrees. These angles of rotation are obtained by tilting the grooves 15A and 15B through an angle of not greater than 30 and 15 degrees, respectively.

Figure 5:
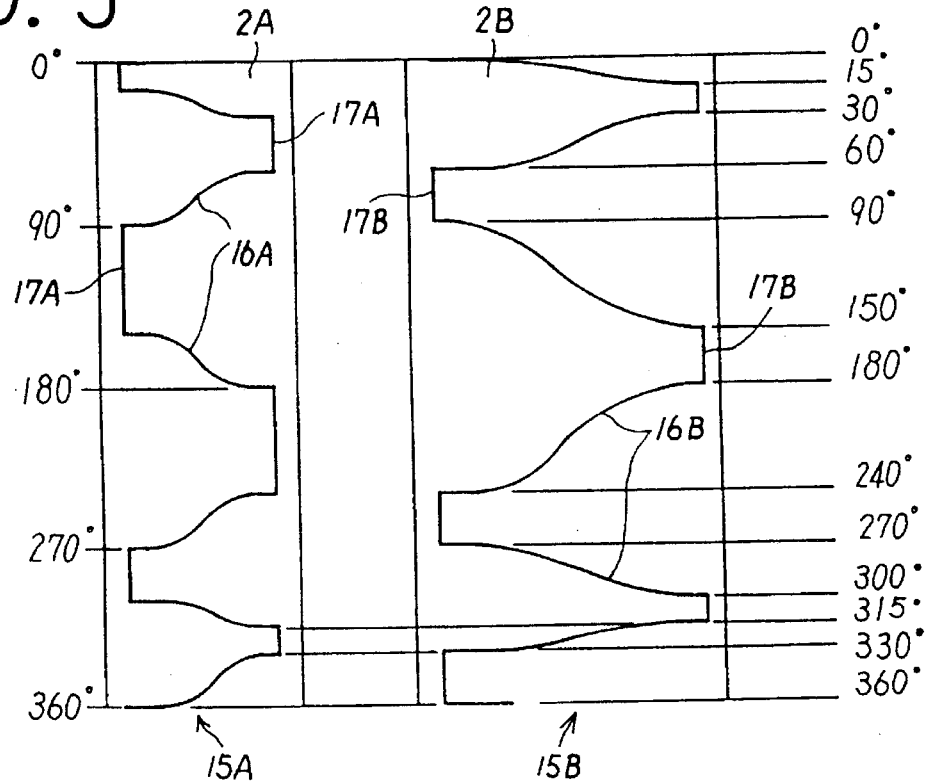
FIG. 5 is an exploded view of another modification of the circulating groove of the first embodiment.

FIG. 5 shows another example that provides three angles of rotation of 15, 30 and 60 degrees. In this example, the axial stroke of the linearly reciprocating member 2B is larger than that of the linearly reciprocating member 2A. This arrangement suited for applications requiring many different angles of rotation can be obtained by simply changing the contour of the circulating grooves 15A and 15B.

The circumferentially extending grooves 17A and 17B must have such length as may permit, when the motion of either the linearly reciprocating member 2A or 2B rotates the rotating member 3, the other member 2B or 2A to rotate through the same angle. The angle of rotation imparted by the tilted grooves 16A and 16B may be selected as desired so long as the above relationship is maintained.

While the first embodiment described above has two linearly reciprocating members 2A and 2B, more than two linearly reciprocating members may be coaxially disposed, as well.

Figure 6:
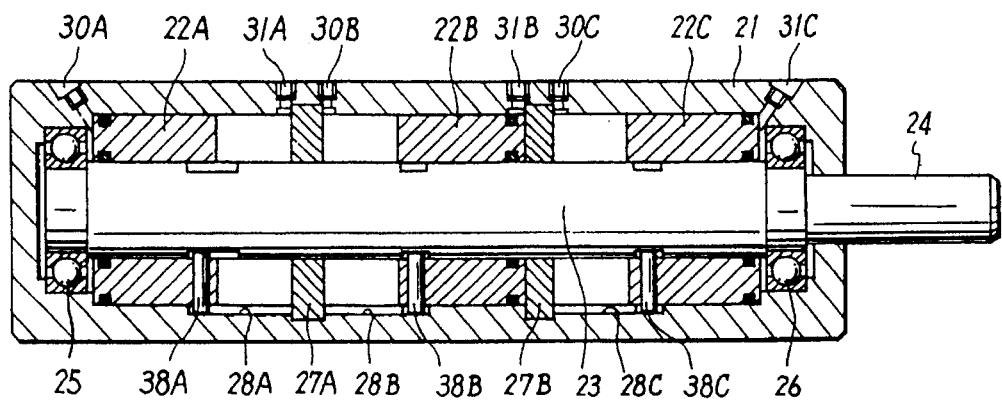
FIG. 6 is a vertical cross-sectional view of a second embodiment of this invention.
Figure 7:
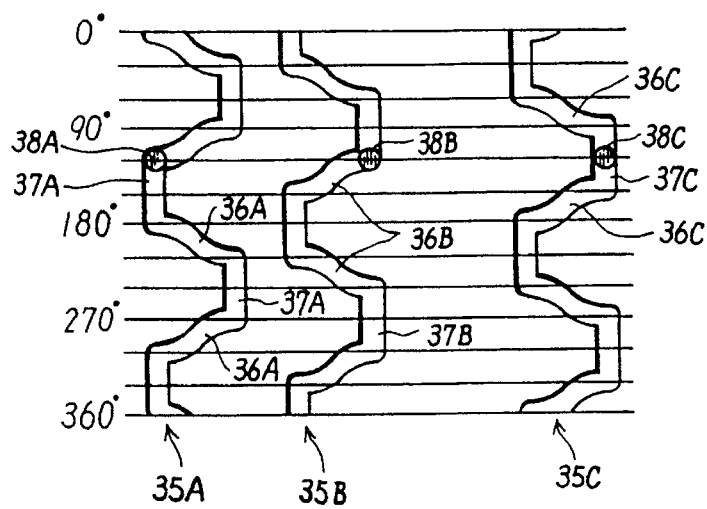
FIG. 7 is an exploded view showing the pattern of the circulating grooves of the second embodiment.

FIGS. 6 and 7 show a second embodiment of this invention having three linearly reciprocating members 22A, 22B and 22C. An output shaft 24 is rotated stepwise forward or backward by selectively reciprocating the members 22A, 22B or 22C.

The first embodiment has the circulating grooves 15A and 15B cut in the surface of either the housing 1 or the linearly reciprocating members 2A and 2B and the projections 18A and 18B raised on the surface of the other. The circulating grooves and projections may also be provided on the linearly reciprocating members 2A and 2B and the rotating member 3, too. Then, either of the linearly reciprocating members 2A and 2B and the common rotating member 3 contained in the housing 1 has the circulating grooves cut in the circumferential surface thereof, while the other hold the projections that fit in the circulating grooves. The housing and linearly reciprocating members are connected by such coupling means as will restrict the rotation of both while allowing the free axial motion thereof.

The second embodiment shown in FIGS. 6 and 7 have the circulating grooves and projections fitting therein between the linearly reciprocating members 22A, 22B and 22C and the rotating member 23. The same arrangement is also applicable to not only the first embodiment but also other embodiments to be described later.

The second embodiment of this invention shown in FIGS. 6 and 7 comprises a cylindrical housing 21 containing three linearly reciprocating members 22A, 22B and 22C that are independently and coaxially slidable. A common rotating member 23 rotatably supported by bearings 25 and 26 is passed through the linearly reciprocating members 22A, 22B and 22C, with an output shaft 24 projecting axially from the housing 21.

The housing 21 whose both ends are hermetically sealed is divided into three independent fluid pressure chambers serving as cylinders by means of partition walls 27A and 27B through which the rotating member 23 is hermetically passed. The linearly reciprocating members 22A, 22B and 22C serve as pistons hermetically sliding along the inner wall of the housing 21 and the circumferential surface of the rotating member 23. The fluid pressure (pneumatic or oil) supplied through ports 30A to 30C and 31A to 31C at both ends of the housing 21 acts on the outer end surface of each piston to cause it to move back and forth.

The rotating member 23 has on the circumferential surface thereof facing the linearly reciprocating members 22A, 22B and 22C endless zigzag circulating grooves 35A, 35B and 35C consisting of a number of grooves 36A, 36B and 36C that are alternately tilted in opposite directions with respect to the generator and circumferentially extending grooves 37A, 37B and 37C that connect the adjoining tilted grooves at both ends thereof.

Through the linearly reciprocating members 22A, 22B and 22C are passed pins that form projections 38A, 38B and 38C whose tips are adapted to fit in the circulating grooves 35A, 35B and 35C. The outer ends of the pins are fitted in grooves 28A, 28B and 28C extending in the direction of the generator cut in the inner wall of the housing 1 guide the axial motion of the linearly reciprocating members 22A, 22B and 22C. As described earlier, these pins may be replaced with balls or other similar means fitted in holes provided in the inner and/or outer surface of the linearly reciprocating members 22A, 22B and 22C.

As is obvious from FIG. 7, the circumferential length of the circumferentially extending grooves 37A, 37B and 37C of the circulating grooves 35A, 35B and 35C on the linearly reciprocating grooves 22A, 22B and 22C corresponds to the angle of rotation imparted to each linearly reciprocating member by the tilted grooves on the other linearly reciprocating members when the other linearly reciprocating members move axially. For example, the circumferential length of the circumferentially extending groove 37A of the circulating groove 35A on the linearly reciprocating member 22A corresponds to the sum of the angles of rotation the tilted grooves 36B and 36C impart to the linearly reciprocating members 22B and 22C when they move axially.

The position of the tilted grooves 36A, 36B and 36C of the circulating grooves 35A, 35B and 35C on the linearly reciprocating members 22A, 22B and 22C individually corresponds to the position of the circumferentially extending grooves of the circulating grooves on other linearly reciprocating members.

In this second embodiment, as in the first embodiment, pressurized fluid is supplied from one of the ports selected from 30A to 30C or 31A to 31C to axially move one of the linearly reciprocating members 22A, 22B and 22C, with the resulting axial motion rotating the rotating member.

In the state shown in FIG. 7, the projection 38C on the linearly reciprocating member 22C located midway in the circumferentially extending groove 37C of the circulating groove 35C on the rotating member 23 inhibits the axial motion of the linearly reciprocating member 22C. Thus, the motion of either of the linearly reciprocating members 22A and 22B rotates the rotating member 23 forward or backward.

If, for example, the inclination of the tilted grooves of the circulating grooves in the first embodiment is decreased to decrease the angle of rotation resulting from the linear motion of the linearly reciprocating members, adjoining tilted grooves will become too close to each other to provide the circumferentially extending grooves that are necessary for the attainment of smooth motion. Provision of many linearly reciprocating members on a common axis permits scattering the tilted grooves thereon, thus eliminating the problem with the too closely spaced tilted grooves.

In the second embodiment described above, the partition walls 27A and 27B through which the rotating member 23 hermetically passes divide the space inside the housing 21 into three cylinder chambers. However, the partition walls may be eliminated by appropriately controlling the air pressure.

Figure 8:
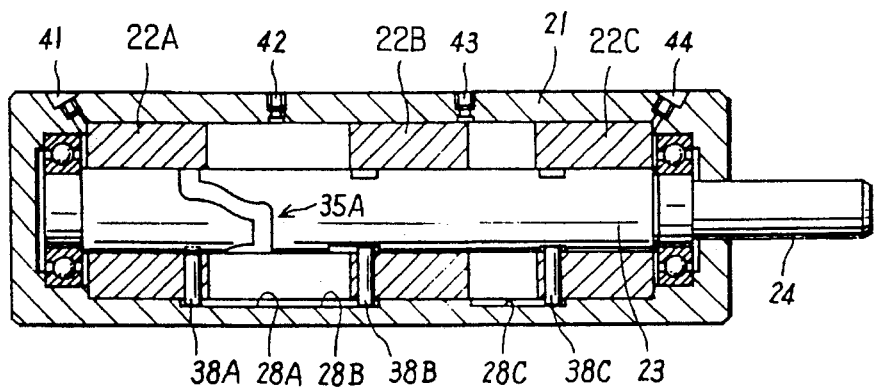
FIG. 8 is a vertical cross-sectional view of a third embodiment of this invention.

A third embodiment of this invention shown in FIG. 8 has no partition walls. Because it is substantially similar to the second embodiment except for the lack of partition walls and the presence of ports 41 to 44 through which pressurized fluid is supplied, the parts similar or corresponding to those of the second embodiment are designated by similar reference characters. The exploded views of the circulating grooves shown in FIG. 9 are also similar to those of the second embodiment.

The housing 21 has a port 41 that supplies pressurized fluid to the outer end surface of the linearly reciprocating member 22A, a port 42 that supplies pressurized fluid to the facing end surfaces of the linearly reciprocating members 22A and 22B, a port 43 that supplies pressurized fluid to the facing end surfaces of the linearly reciprocating members 22B and 22C, and a port 44 that supplies pressurized fluid to the outer end surface of the linearly reciprocating member 22C.

Pressurized fluids are supplied and discharged through the individual ports of the third embodiment according to the forward and backward rotation programs shown on both sides of the exploded view in FIG. 9 (the heavy lines indicating the time during which pressurized fluids are supplied). The position of the projections 38A, 38B and 38C in FIG. 9 corresponds to the state shown in FIG. 8 when the linearly reciprocating members 22A, 22B and 22C are moved. The forward and backward rotation programs on both sides of the exploded view show the timing of fluid supply and discharge through the ports 41 to 44 whereby the projections 38A, 38B and 38C move along the circulating grooves 35A, 35B and 35C in FIG. 9.

When the projections 38A, 38B and 38C are in the position shown in the exploded view in FIG. 9, for example, the port 42 through which pressurized fluid has been supplied is opened to the atmosphere, whereas the supply of pressurized fluid through the port 43 continues. Therefore, the linearly reciprocating member 22A moves to the left while the linearly reciprocating members 22B and 22C move to the right, as shown in FIG. 8. Although pressurized fluid has been supplied through the port 43, the linearly reciprocating member 22B has remained at the right end, without moving to the left, because the projection 38B has been in the circumferentially extending groove 37B. When the projection 38B enters the tilted groove 36B, however, the linearly reciprocating member 22B moves to the left to cause the projection 38B to move along the tilted groove 36B, thereby rotating the rotating member 23 through an angle of 30 degrees.

When the operation program advances one step, the port 43 through which pressurized fluid has been supplied is opened to the atmosphere, whereas pressurized fluid is supplied through the port 44. Then, the linearly reciprocating member 22C moves to the left to rotate the rotating member 23 forward. When the operation program advances another step, pressurized fluid is supplied through the port 41 to move the linearly reciprocating member 22A to the right. The operation program continues to move the reciprocating member by the same process. The rotation of the rotating member 23 can be reversed by using the reversing program.

The two or more linearly reciprocating members mounted on a common axis in the stepping actuators described above may also be mounted in parallel or on different axes.

Figure 10:
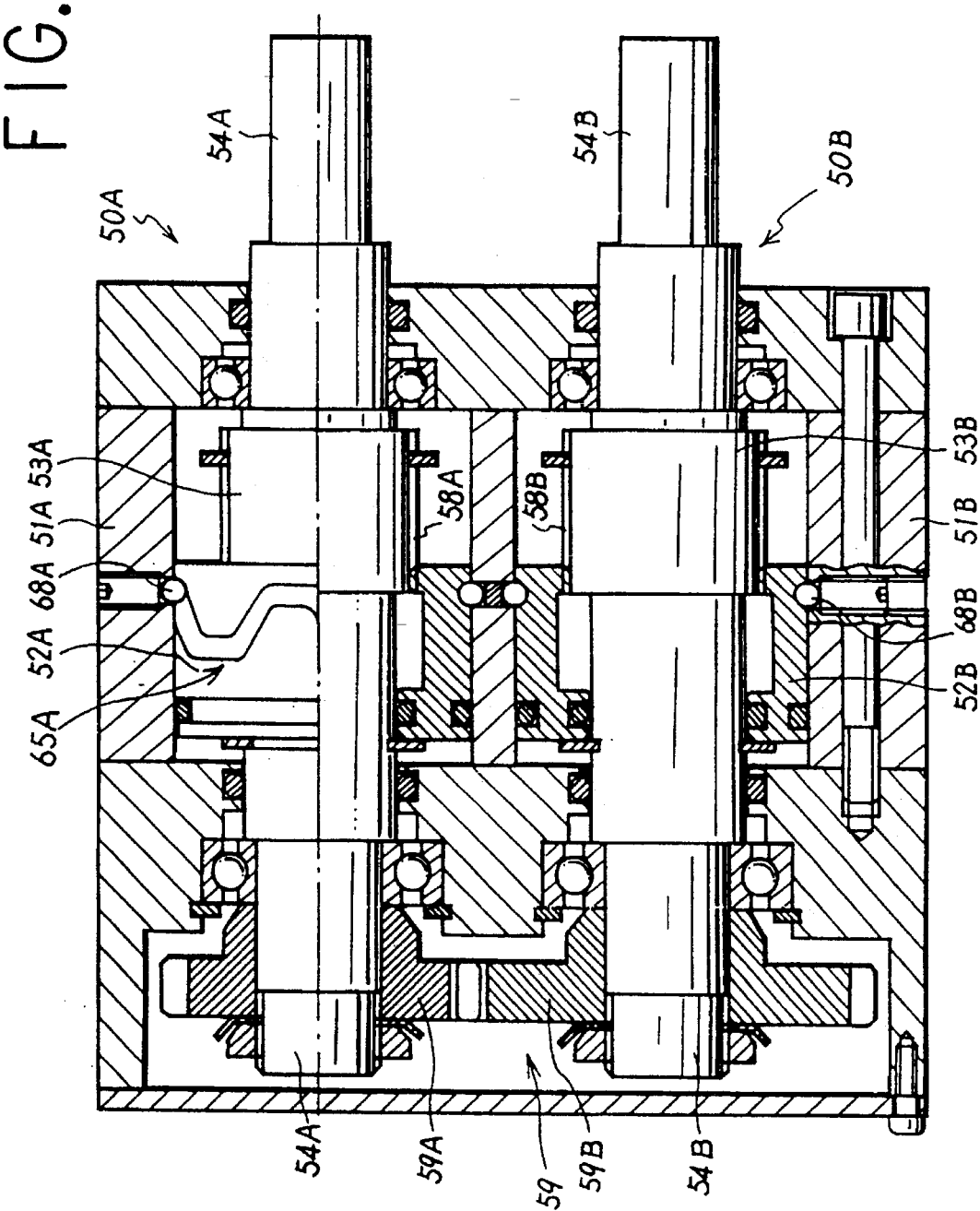
FIG. 10 is a vertical cross-sectional view of a fourth embodiment of this invention.

FIG. 10 shows a fourth embodiment of this invention in which the linearly reciprocating members and rotating member are disposed in parallel. A pair of motion conversion units 50A and 50B comprise cylindrical housings 51A and 51B containing axially slidable reciprocating members 52A and 52B through which rotating members 53A and 53B are passed, with output shafts 54A and 54B projecting from the housings 51A and 51B. The motion conversion units 50A and 50B and the output shafts 54A and 54B are linked together by a rotation transmitting mechanism 59. The housings 51A and 51B, which form one integral unit in the embodiment being described, may also be formed as separate units. The motion conversion units need not be two. More than two units, with the output shafts thereof linked together by a rotation transmitting mechanism, may also be used.

As shown in a simplified way, either of the housings 51A and 51B and the linearly reciprocating members 52A and 52B have circulating grooves 65A and 65B, which will be described later by reference to FIG. 11, cut in the circumferential surface thereof, while the other hold projections 68A and 68B adapted to fit in the circulating grooves 65A and 65B. The projections 68A and 68B are balls held in the holes provided in either the housings or linearly reciprocating members and fitted in the circulating grooves cut in the other. The linearly reciprocating members 52A and 52B and the rotating members 53A and 53B are slidably linked together by such coupling means as will restrict the rotation of both while allowing the free axial motion thereof. The coupling means comprise a number of axially extending projections 58A and 58B on the circumferential surface of the rotating members 53A and 53B and a corresponding number of grooves cut in the circumferential surface of the linearly reciprocating members 52A and 52B that are splined together.

The output shafts 54A and 54B of the motion conversion units 50A and 50B are linked together by the rotation transmitting mechanism 59. Not only the intermeshing gears 59A and 59B illustrated, but also a timing belt, perforated belt or other mechanisms that steadily impart synchronized rotary motions may also be used as the rotation transmitting mechanism 59. Furthermore, the rotation transmitting mechanism 59 may either transmits rotation between the linked output shafts 54A and 54B without changing the angular velocity ratio or, otherwise, vary the angular velocity ratio by varying the diameter (or the number of teeth) of the gears 59A and 59B.

When the rotation transmitting mechanism 59 transmits rotation between the output shafts 54A and 54B without changing the angular velocity ratio, the circulating grooves 65A and 65B of the fourth embodiment consist of endless zigzag grooves consisting of tilted and circumferentially extending grooves as in other preceding embodiments. When the angular velocity ratio between the output shafts 54A and 54B are varied (such as 3:4), however, the tilted grooves 66A and 66B and circumferentially extending grooves 67A and 67B must be designed with consideration of the angular velocity ratio therebetween, as shown in FIG. 11.

Figure 11:
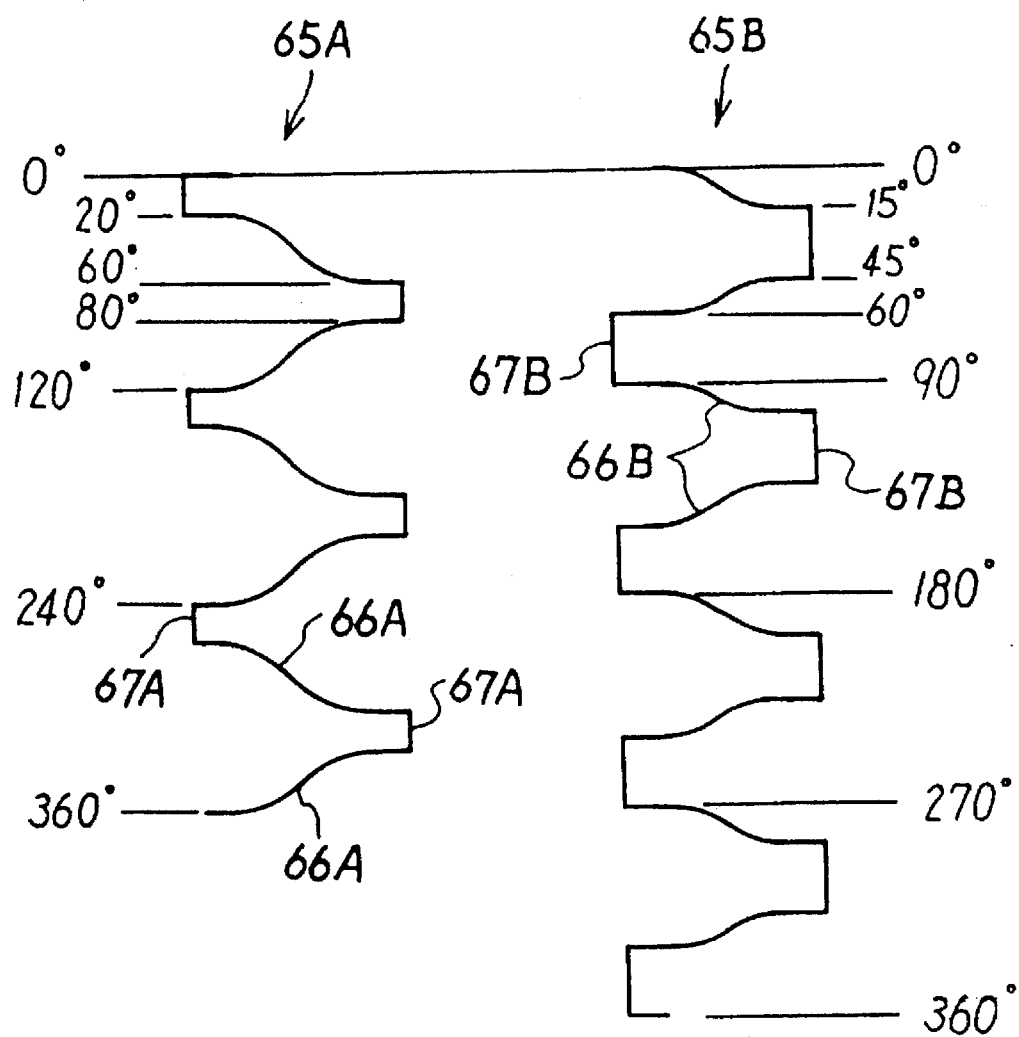
FIG. 11 is an exploded view showing the pattern of the circulating grooves of the fourth embodiment.

The circulating grooves 65A and 65B of the motion conversion units 50A and 50B shown in FIG. 11 comprise tilted grooves 66A and 66B and circumferentially extending grooves 67A and 67B. The circumferential length of the circumferentially extending grooves 67A or 67B of the circulating grooves 65A or 65B on either of the motion conversion units 50A and 50B corresponds to the angle of rotation provided by the tilted grooves 66B or 66A when the linearly reciprocating member 52B or 52A in the other motion conversion unit 50B or 50A. The circulating grooves 65A and 65B are provided in the circumferential surfaces of 360 degrees between the housings 51A and 51B and linearly reciprocating members 52A and 52B of the motion conversion units 50A and 50B.

As is obvious from FIG. 11, two or more motion conversion units having different numbers of tilted grooves provided within the range of 360 degrees may be linked together in s stepping actuator of the type just described.

The operation of a stepping actuator having the circulating grooves of the type shown in FIG. 11 is briefly described below. When the linearly reciprocating member 52B is axially moved to rotate the output shaft 54B through 15 degrees, for example, the rotation is transmitted to the output shaft 54A through the rotation transmitting mechanism 59, whereupon the output shaft 54A rotates through 20 degrees according to the tooth ratio between the gears 59A and 59B. When the linearly reciprocating member 52A is axially moved next to rotate the output shaft 54A through 40 degrees, the rotation is transmitted to the output shaft 54B through the rotation transmitting mechanism 59, whereby the output shaft 54B rotates 30 degrees (or a total of 45 degrees). When the linearly reciprocating member 52B is further moved axially to rotate the output shaft 54B through 15 degrees, the output shaft 54A rotates through 20 degrees.

Of course, the output shafts can be rotated stepwise in either direction by selectively moving the linearly reciprocating members.

This design permits remarkably reducing the axial length of the entire stepping actuator, which offers a significant advantage where overall size limitations must be considered. By selecting an appropriate tooth ratio between the gears making up the rotation transmitting mechanism 59, a too close approach of adjoining tilted grooves can be avoided even when the angle of rotation resulting from the motion of the linearly reciprocating members 52A and 52B is small.

The circulating grooves 65A and 65B and projections 68A and 68B may also be provided between the linearly reciprocating members 52A and 52B and rotating members 53A and 53B, as in the preceding embodiments.

Figure 12:
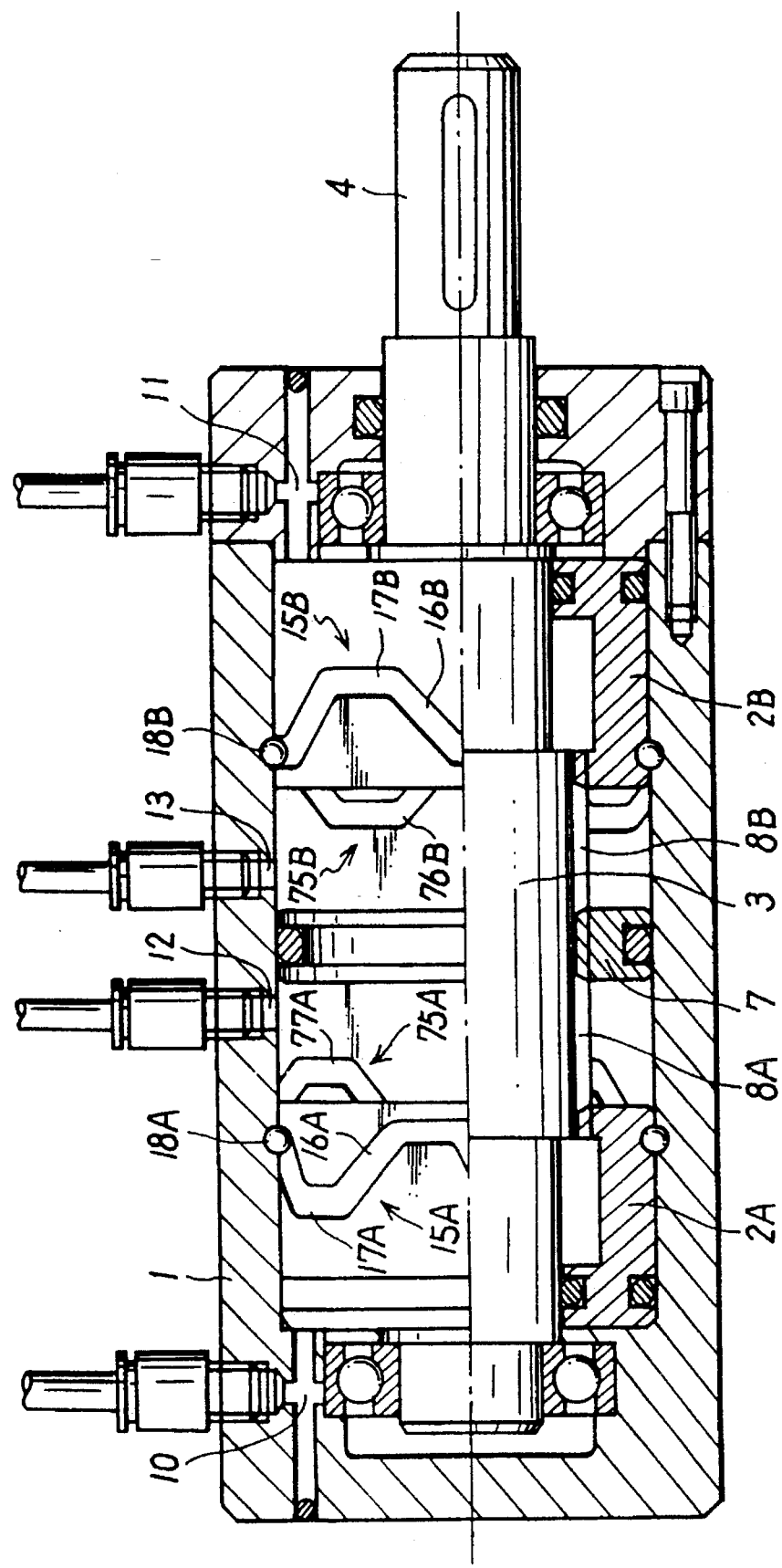
FIG. 12 is a vertical cross-sectional view of a fifth embodiment of this invention.
Figure 13:
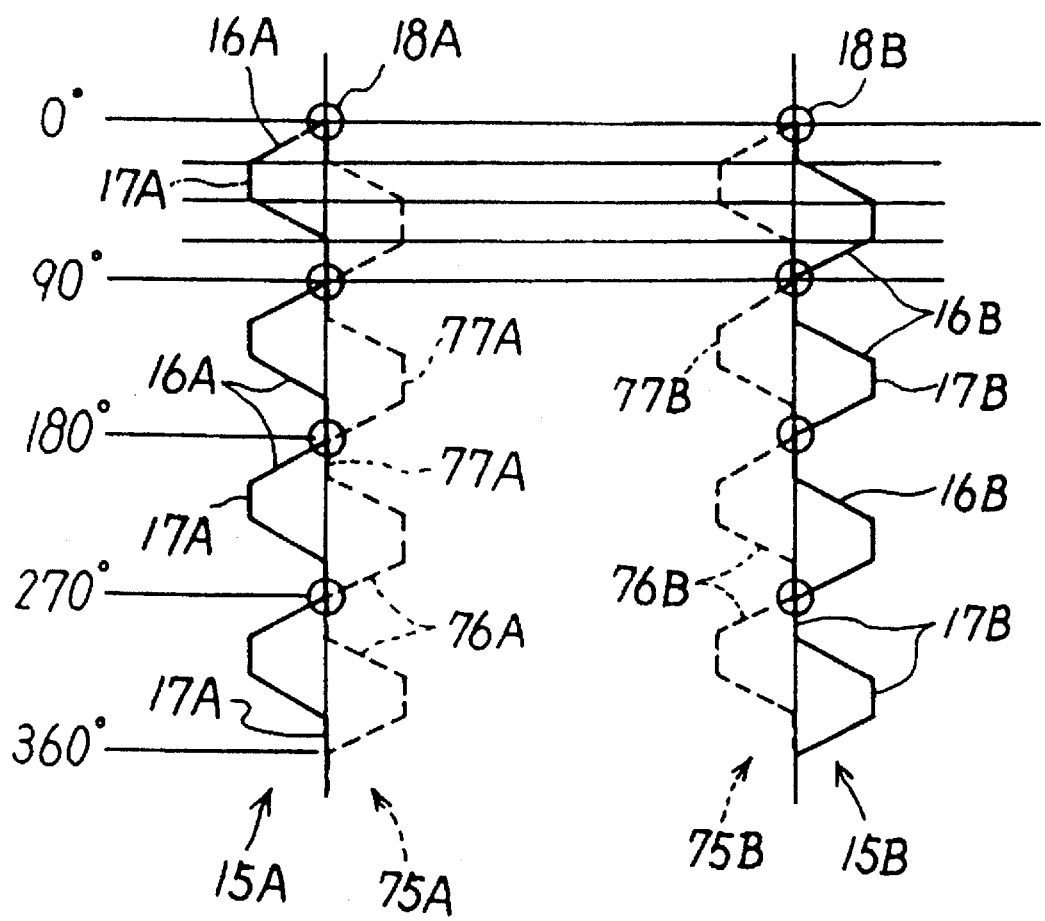
FIG. 13 is an exploded view showing the surface of the rotating member and the pattern of the circulating grooves in the inner housing of the fifth embodiment.

A fifth embodiment of this invention shown in FIGS. 12 and 13 is a modification of the first embodiment shown in FIGS. 1 and 2. The projections 18A and 18B are balls fitted in two facing sets of circulating grooves, one comprising the circulating grooves 15A and 15B cut in the circumferential surface of the linearly reciprocating members 2A and 2B and the other the circulating grooves 75A and 75B cut in the internal wall of the housing 1. Because this fifth embodiment is similar to the first embodiment in other respects, similar or corresponding parts thereof are designated by similar reference characters, with no detailed description given.

FIG. 13 schematically shows the contours of the circulating grooves 15A and 15B cut in the circumferential surface of the linearly reciprocating members 2A and 2B and 75A and 75B in the inner wall of the housing 1. The circulating grooves 15A and 15B cut in the circumferential surface are indicated by solid lines, while the circulating grooves 75A and 75B in the inner wall of the housing 1 are indicated by dotted lines, with the balls fitted therein by circles.

As is obvious from FIG. 13, the circulating grooves 15A and 15B cut in the circumferential surface of the linearly reciprocating members 2A and 2B comprise substantially the same tilted grooves 16B and 16A and circumferentially extending grooves 17A and 17B as those shown in FIG. 2, whereas the circulating grooves 75A and 75B cut in the inner wall of the housing 1 comprise similar tilted grooves 76B and 76A and circumferentially extending grooves 77A and 77B.

Figure 14:
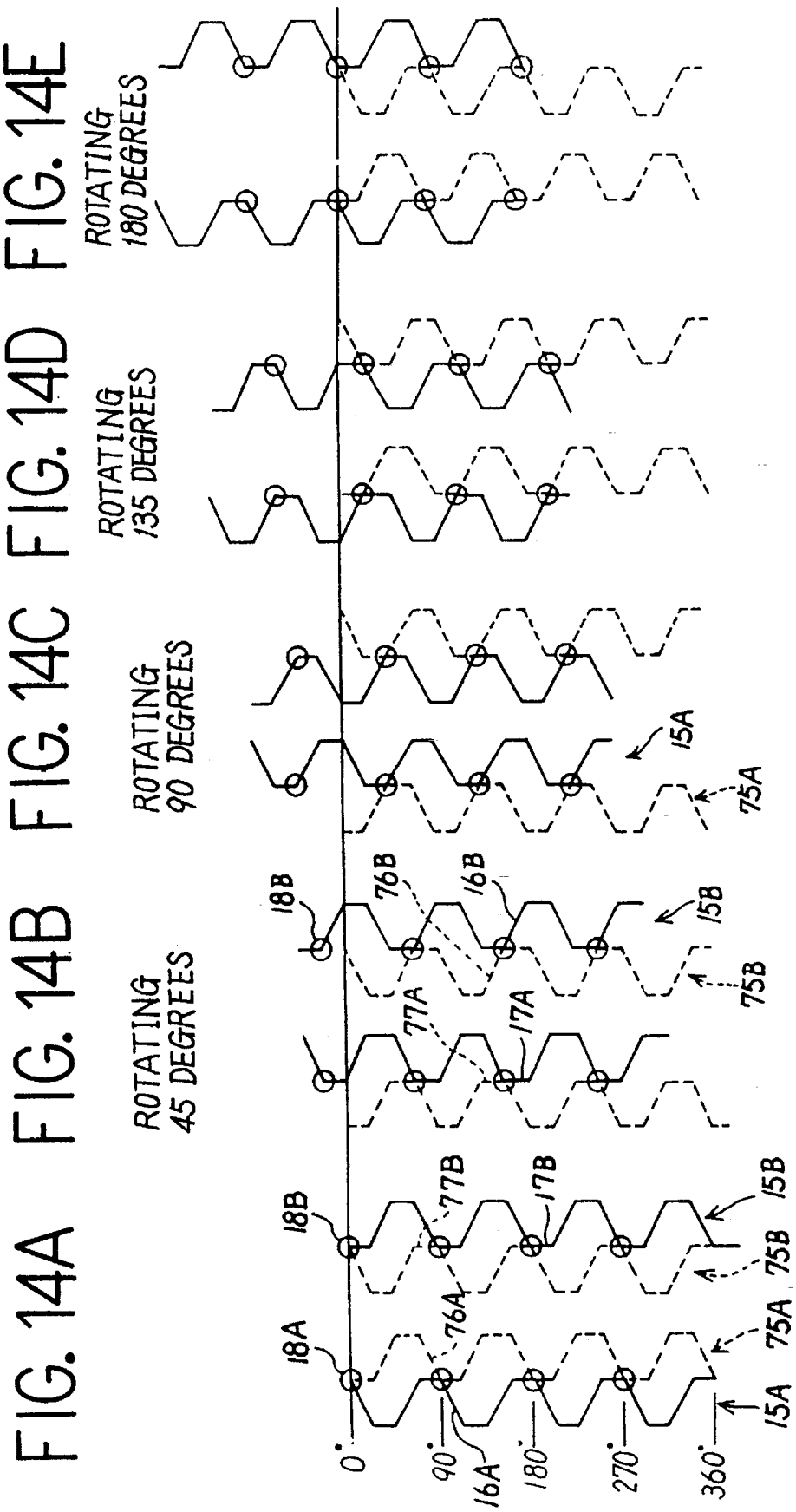
FIGS. 14A–14E illustrate the operation of the fifth embodiment.

When pressurized fluid is supplied through the port 10 of the fifth embodiment in the state shown in FIGS. 12 and 13, or in FIG. 14A, the linearly reciprocating member 2A moves rightward from the left end in FIG. 12, whereby the projections 18A move along the tilted grooves 16A and 76A. Then, the linearly reciprocating member 2A rotates through an angle (45 degrees) imparted by the two tilted grooves, with the rotation thereof transmitted to the rotating member 3, whereupon the projections 18B move along the circumferentially extending grooves 17B and 77B of the circulating grooves 15B and 75B. FIG. 14B shows the state obtained on completion of these movements.

When, next, pressurized fluid is supplied through the port 11 to move leftward the linearly reciprocating member 2B from the position in FIG. 12, the projections 18B move along the tilted grooves 16B and 76B. The linearly reciprocating member 2B rotates through an angle (45 degrees) imparted by the contour of the tilted grooves, with the rotation thereof transmitted to the rotating member 3, whereupon the projections 18A move along the circumferentially extending grooves 17A and 77A of the circulating grooves 15A and 75A, as shown in FIG. 14C. The states shown in FIG. 14D and 14C are obtained when the linearly reciprocating members are alternately moved axially. The rotation of the output shaft can be reversed by reversing the axial motion of the linearly reciprocating member just moved in either direction.

The balls 18A and 18B fitted between the circulating grooves 15A and 75A and between 15B and 75B as the projections transmit force by rolling. The balls thus assure smooth rotation as they efficiently convert motion producing less friction with the inner surface of the circulating grooves than other types of projections.

The circulating grooves 15A, 15B, 75A and 75B provided in the facing surfaces of the linearly reciprocating members 2A and 2B and the housing 1 of the fifth embodiment just described may also be provided in the facing surfaces of the linearly reciprocating members and the rotating member.

Figure 15:
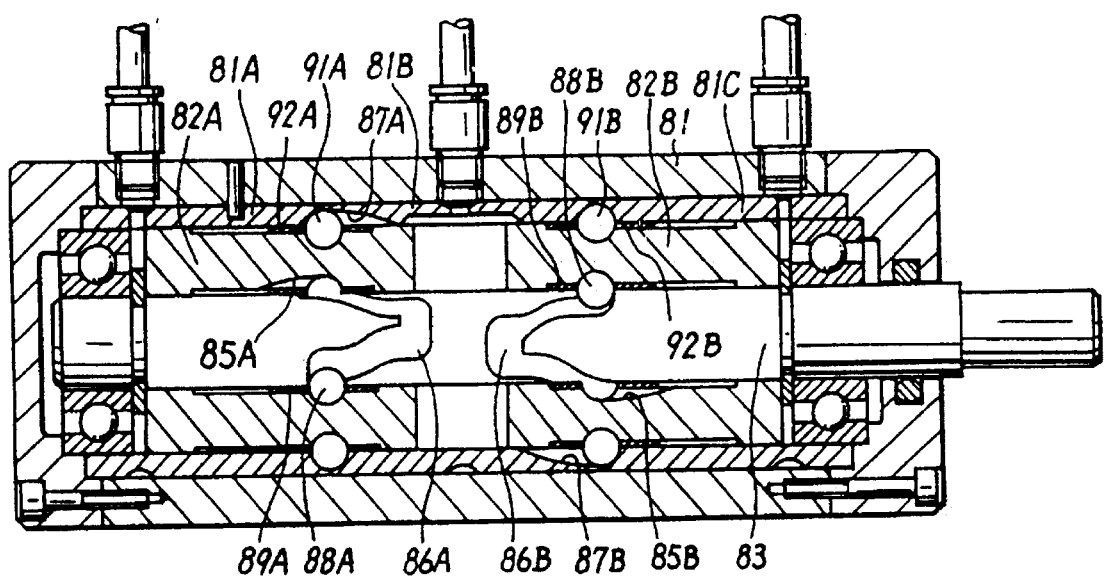
FIG. 15 is a vertical cross-sectional view of a sixth embodiment of this invention.

A sixth embodiment shown in FIG. 15 has circulating grooves 85A, 85B, 86A and 86B similar to those of the fifth embodiment provided in the facing surfaces of linearly reciprocating members 82A and 82B and a rotating member 83, with circulating grooves 87A and 87B provided in the inner wall of a housing 81. Retainers 89A and 89B hold balls 88A and 88B serving as the projections fitted between a pair of the circulating grooves 85A and 86A and another pair of the circulating grooves 85B and 86B.

The sixth embodiment has split sleeves 81A, 81B and 81C fitted in the housing 81. While ball-shaped projections 91A and 91B held in the holes in the outer circumferential surface of the linearly reciprocating members 82A and 82B are fitted in the circulating grooves 87A and 87B provided on the inner side of the split sleeves, retainers 92A and 92B to hold the projections are provided on the outside of the linearly reciprocating members 82A and 82B.

Figure 16:
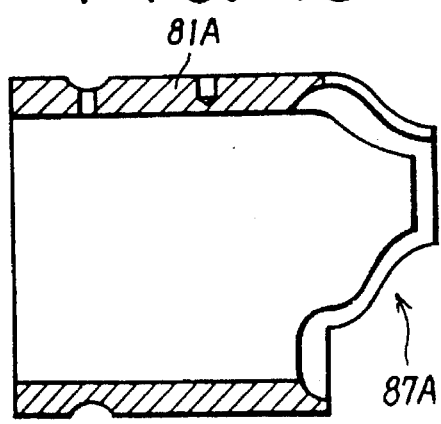
FIG. 16 is a cross-sectional view of split sleeves located in the housing of the sixth embodiment.

To facilitate the making of the circulating grooves 87A and 87B to fit in the projections 91A and 91B, the sleeves 81A, 81B and 81C are adapted to be split on the center line of the circulating grooves 87A and 87B. FIG. 16 shows the cross-sectional profile of the split sleeve 81A.

Figure 17:
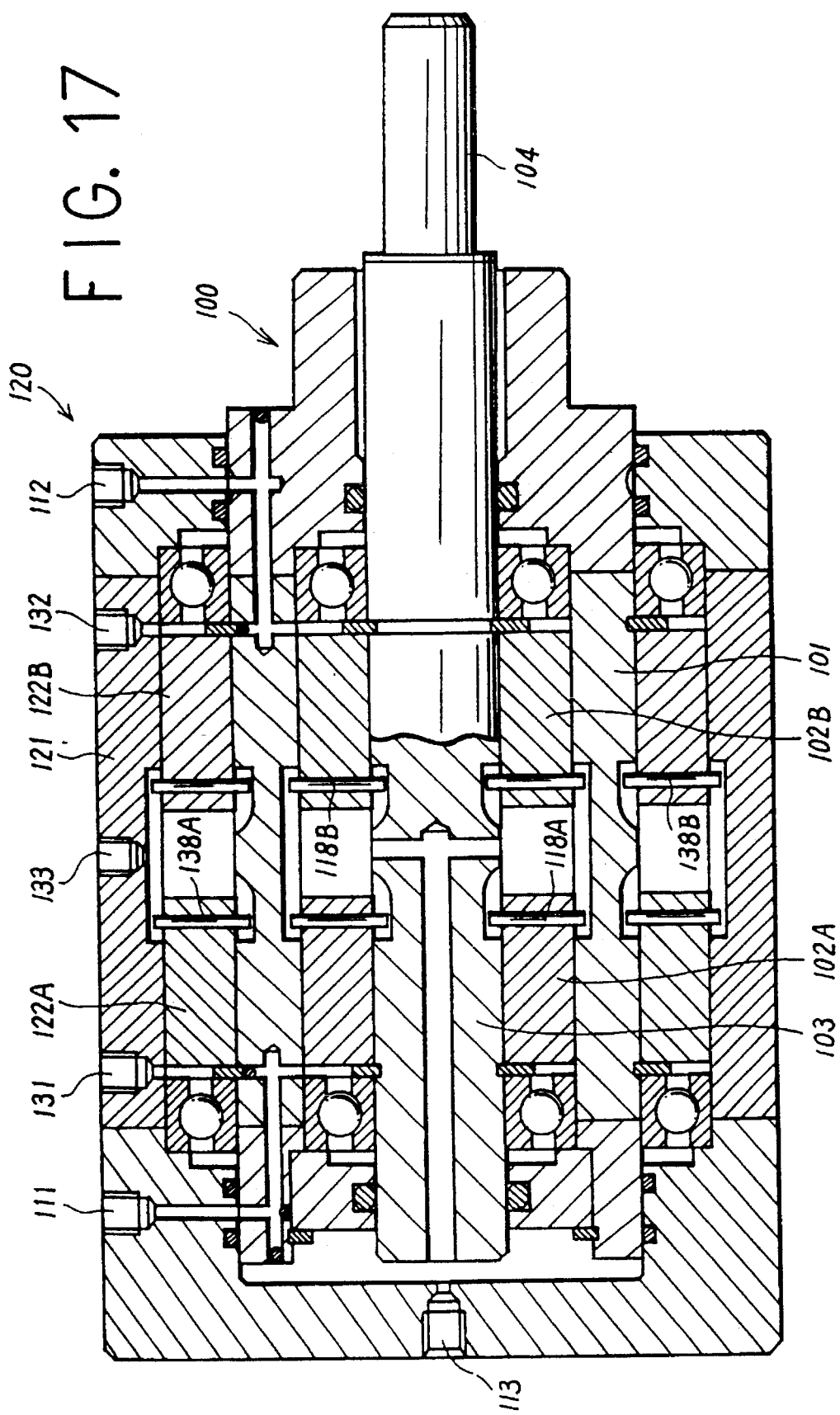
FIG. 17 is a vertical cross-sectional view of a seventh embodiment of this invention.

FIG. 17 shows an embodiment having an first inner stepping actuator 100 comprising two of the three linearly reciprocating members 22A, 22B and 22C of the third embodiment shown in FIG. 8, with a second stepping actuator 120 of similar construction mounted outside the housing.

Briefly, the inner stepping actuator 100 comprises a cylindrical housing 101 having two linearly reciprocating members 102A and 102B coaxially and slidably disposed therein and a common rotating member 103 passed therethrough, with an output shaft 104 projecting outward. A housing 121 of the outer stepping actuator 120 has ports 111, 112 and 113 through which pressurized fluid to move the linearly reciprocating members 102A and 102B is supplied.

Figure 18:
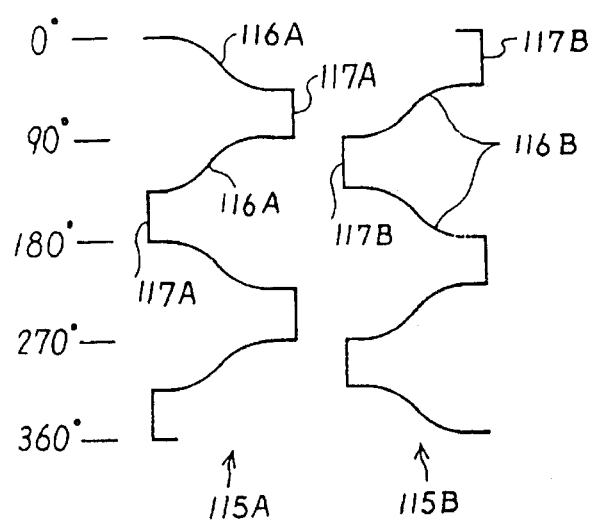
FIG. 18 is an exploded view showing the pattern of the circulating grooves of the inner stepping actuator of the seventh embodiment.

Endless circulating grooves 115A and 115B comprising a number of tilted grooves 116A and 116B and circumferentially extending grooves 117A and 117B, as shown in an exploded view in FIG. 18, are provided in the surface of the rotating member 103 facing the linearly reciprocating members 102A and 102B. Projections 118A and 118B on the linearly reciprocating members 102A and 102B are fitted in the circulating grooves 115A and 115B.

The second stepping actuator 120 is fitted over the housing 101 of the inner stepping actuator 100 that serves as the rotating member thereof.

The second stepping actuator 120 holds two linearly reciprocating members 122A and 122B that are axially slidably disposed between the outer housing 121 and the inner housing 101 that serves as the rotating member thereof. The housing 121 has ports 131, 132 and 133 through which pressurized fluid to move the linearly reciprocating members 122A and 122B is supplied and discharged.

Figure 19:
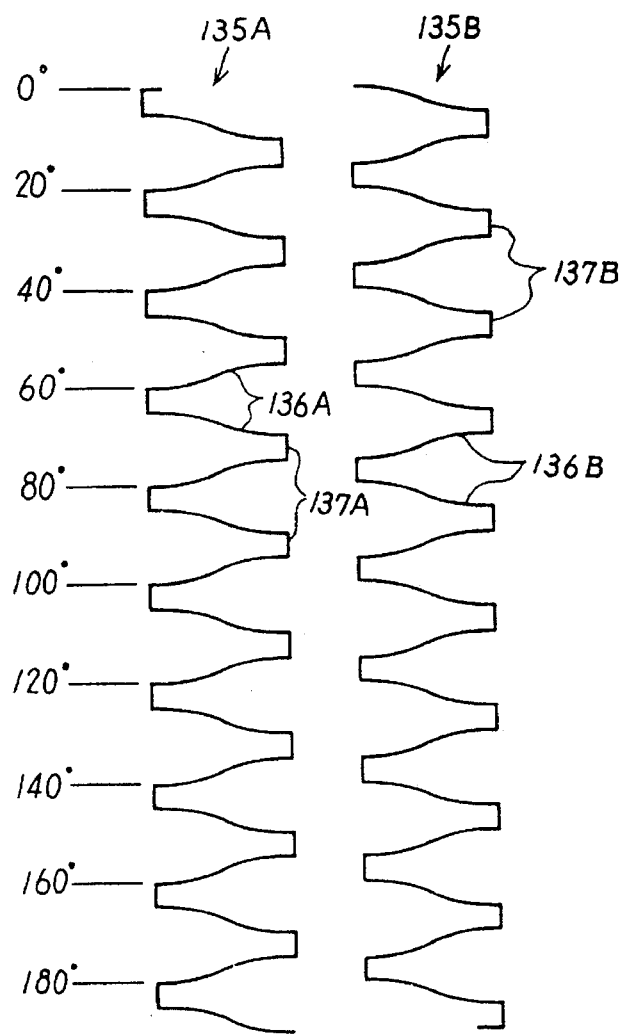
FIG. 19 is an exploded view showing the pattern of the circulating grooves of the second stepping actuator of the seventh embodiment.

Endless circulating grooves 135A and 135B comprising a number of tilted grooves 136A and 136B and circumferentially extending grooves 137A and 137B, as shown in an exploded view in FIG. 19, are provided in the surface of the housing 101 facing the linearly reciprocating members 122A and 122B. Projections 138A and 138B on the linearly reciprocating members 122A and 122B are fitted in the circulating grooves 135A and 135B.

In this double-pipe type stepping actuator, the output shaft can be rotated stepwise, forward or backward, by selectively moving the linearly reciprocating members 102A, 102B, 122A and 122B of the inner and outer stepping actuators 100 and 120. As the inner and outer stepping actuators individually rotate the output shaft, the output shaft is rotated through an angle that is equal to the sum of the angles through which both actuators 100 and 120 rotate. By selecting appropriate angles of rotation for both actuators, therefore, two or more angles of rotation desired can be obtained with ease.

For example, FIG. 18 shows the circulating grooves 115A and 115B of the inner stepping actuator 100 that are designed to rotate the output shaft through 45 degrees when the linearly reciprocating members 102A and 102B move one step. FIG. 19 shows the circulating grooves 135A and 135B of the outer stepping actuator 120 that are designed to rotate the output shaft through 5 degrees when the linearly reciprocating members 122A and 122B move one step. Then, the output shaft can be rotated through an angle of plus 95 degrees by moving the linearly reciprocating members of the inner actuator two steps and those of the outer actuator one step. Similarly, the output shaft can be rotated through an angle of plus 25 degrees by moving the linearly reciprocating members of the inner actuator one step and reversing those of the outer actuator four steps (which correspond to an angle of minus 20 degrees).

The rotary stepping actuators according to this invention convert linear reciprocating motions to stepwise rotary motions through any desired angles, either forward or backward, by means of the precise motion of the projections along the circulating grooves that assures steady and smooth stepwise rotation of the output shaft in any desired direction.

The above-mentioned stepping actuator can be utilized as linear actuator which connects the output shaft to the ball screw, and screws the output member being guided toward axial line into the said ball screw.

What is claimed is:

1. A stepping actuator comprising:

a cylindrical housing having an inner circumferential surface;

plural linearly reciprocating members provided in said housing and having respective outer circumferential surfaces facing said inner circumferential surface, said linearly reciprocating members having a common axis and each being slidable along said common axis;

a rotating member passing through said linearly reciprocating members, an axis of said rotating member being identical to said common axis;

one of said inner circumferential surface of said housing and said outer circumferential surface of each said linearly reciprocating member having an endless zig-zag circulating groove formed by tilted grooves interconnected by circularly extending grooves, said tilted grooves being tilted alternatively in opposite directions, said circularly extending grooves connecting end portions of adjoining of said tilted grooves;

the other of said inner circumferential surface of said housing and said outer circumferential surface of said each linearly reciprocating member having projections being adapted to fit in said circulating groove;

each circularly extending groove corresponding to one of said linearly reciprocating members having a circumferential length equal to a circumferential length of an opposite tilted groove corresponding to another of said slidable reciprocating members when there is only one other slidable reciprocating member, and having a circumferential length equal to a total circumferential length corresponding to a sum of opposite tilted grooves corresponding to others of said slidable reciprocating members when there are more than one other slidable reciprocating members; and a coupling linking each linearly reciprocating member and said rotating member such that rotation of each linearly reciprocating member is transmitted to said rotating member while each linearly reciprocating member is axially slidable along said rotating member.

2. A stepping actuator comprising:

a cylindrical housing;

plural linearly reciprocating members provided in said housing and having respective inner circumferential surfaces, said linearly reciprocating members having a common axis and each being slidable along said common axis;

a rotating member passing through said linearly reciprocating members and having an outer circumferential surface facing said inner circumferential surface of each linearly reciprocating member, an axis of said rotating member being identical to said common axis;

one of said inner circumferential surface of each said linearly reciprocating member and said outer circumferential surface of said rotating member having an endless zigzag circulating groove formed by tilted grooves interconnected by circularly extending grooves, said tilted grooves being tilted alternatively in opposite directions, said circularly extending grooves connecting end portions of adjoining of said tilted grooves;

the other of said inner circumferential surface of said each linearly reciprocating member and said outer circumferential surface of said rotating member having projections being adapted to fit in said circulating groove;

each circularly extending groove corresponding to one of said linearly reciprocating members having a circumferential length equal to a circumferential length of an opposite tilted groove corresponding to another of said slidable reciprocating members when there is only one other slidable reciprocating member, and having a circumferential length equal to a total circumferential length corresponding to a sum of opposite tilted grooves corresponding to others of said slidable reciprocating members when there are more than one other slidable reciprocating members; and a coupling linking each linearly reciprocating member and said housing such that each linearly reciprocating member is not rotatable to said housing while each linearly reciprocating member is axially slidable along said housing.

3. A stepping actuator according to claims 1 or 2, comprising two of said linearly reciprocating members.

4. A stepping actuator according to claims 1 or 2, wherein the circumferential length of the circularly extending groove corresponding to one of said linearly reciprocating members is different from the circumferential length of the circularly extending groove corresponding to another of said linearly reciprocating members.

5. A stepping actuator according to claim 1, wherein said other of said inner circumferential surface of said housing and said outer circumferential surface of said each linearly reciprocating member having an additional circulating groove, said projections being balls fitted in both said circulating groove and said additional circulating groove.

6. A stepping actuator according to claim 2, wherein said other of said inner circumferential surface of said each linearly reciprocating member and said outer circumferential surface of said rotating member having an additional circulating groove, said projections being balls fitted in both said circulating groove and said additional circulating groove.

7. A stepping actuator according to claims 1 or 2, further comprising an additional stepping actuator surrounding said housing, said housing serving as a rotating member of said additional stepping actuator and being rotatable stepwise forward and backward.

8. A stepping actuator comprising:

plural motion conversion units having respective cylindrical housings, linearly reciprocating members provided in respective of said housings slidably along a respective axis of each said linearly reciprocating member, each linearly reciprocating member having an outer circumferential surface facing an inner circumferential surface of said respective housing, and rotating members arranged in parallel with each other and passing through respective of said linearly reciprocating members;

one of said inner circumferential surface of each said respective housing and said outer circumferential surface of each said linearly reciprocating member having an endless zigzag circulating groove formed by tilted grooves interconnected by circularly extending grooves, said tilted grooves being tilted alternatively in opposite directions, said circularly extending grooves connecting end portions of adjoining of said tilted grooves;

the other of said inner circumferential surface of each said respective housing and said outer circumferential surface of said each linearly reciprocating member having projections being adapted to fit in said circulating groove;

a coupling linking each linearly reciprocating member with each respective rotating member such that rotation of each linearly reciprocating member is transmitted to the respective rotating member while each linearly reciprocating member is axially slidable along the respective rotating member;

a rotation transmitting mechanism connecting said rotating members such that rotation of any rotation member is transmitted the other rotating member; and each circularly extending groove formed in one of said motion conversion units having a circumferential length corresponding to a rotation angle of the rotating member of said one of said motion conversion units rotated by the other of said motion conversion units when there is only one other motion conversion unit and the linearly reciprocating member of said other motion conversion unit axially moves from one end to another end, and to the rotation angle of the rotating member of said one of said motion conversion units when there are more than one other motion conversion units and the linearly reciprocating members of said other motion conversion units axially move from one end to another end.

9. A stepping actuator according to claim 8, wherein said rotation transmitting mechanism has a predetermined rotation transmitting ratio.

10. A stepping actuator comprising:

plural motion conversion units having respective cylindrical housings, linearly reciprocating members provided in respective of said housings slidably along a respective axis of each said linearly reciprocating member, each linearly reciprocating member having an inner circumferential surface, and rotating members arranged in parallel with each other and passing through respective of said linearly reciprocating members, each rotating member having an outer circumferential surface facing said inner circumferential surface of each said linearly reciprocating member;

one of said inner circumferential surface of each said linearly reciprocating member and said outer circumferential surface of each said rotating member having an endless zigzag circulating groove formed by tilted grooves interconnected by circularly extending grooves, said tilted grooves being tilted alternatively in opposite directions, said circularly extending grooves connecting end portions of adjoining of said tilted grooves;

the other of said inner circumferential surface of each said linearly reciprocating member and said outer circumferential surface of each said rotating member having projections being adapted to fit in said circulating groove;

a coupling linking each linearly reciprocating member with each respective housing such that each linearly reciprocating member is not rotatable to each housing while each linearly reciprocating member is axially slidable along the respective housing;

a rotation transmitting mechanism connecting said rotating members such that rotation of any rotation member is transmitted to the other rotating member; and each circularly extending groove formed in one of said motion conversion units having a circumferential length corresponding to a rotation angle of the rotating member of said one of said motion conversion units rotated by the other of said motion conversion units when there is only one other motion conversion unit and the linearly reciprocating member of said other motion conversion unit axially moves from one end to another end, and to the rotation angle of the rotating member of said one of said motion conversion units when there are more than one other motion conversion units and the linearly reciprocating members of said other motion conversion units axially move from one end to another end.

11. A stepping actuator according to claim 10, wherein said rotation transmitting mechanism has a predetermined rotation transmitting ratio.

12. A stepping actuator according to claims 1, 2, 8 or 10, wherein said housing serves as a hydraulic cylinder to axially move said linearly reciprocating member and said linearly reciprocating member serves as a piston moved by pressurized fluid.

\* \* \* \* \*